United States Patent

[11] 3,571,781

[72] Inventors Albert J. Gartland, Jr.
Trumbull;
Vincent F. Lipinski, Stratford; George A. Riley, Bridgeport, Conn.
[21] Appl. No. 781,846
[22] Filed Dec. 6, 1968
[45] Patented Mar. 23, 1971
[73] Assignee Harvey Hubbell, Incorporated
Bridgeport, Conn.

[54] PLASTIC CABLE CLAMP
5 Claims, 8 Drawing Figs.
[52] U.S. Cl. .................................................... 339/105,
339/75, 339/107
[51] Int. Cl. ............................................... H01r 13/56,
H01r 13/58
[50] Field of Search .......................................... 339/103
(all), 105, 107

[56] References Cited
UNITED STATES PATENTS
| | | | |
|---|---|---|---|
| 1,927,780 | 9/1933 | Anderson | 151/69X |
| 3,344,393 | 9/1967 | Hendee | 339/107X |
| 3,390,371 | 6/1968 | Kramer | 339/107 |

Primary Examiner—Marvin A. Champion
Assistant Examiner—Terrell P. Lewis
Attorney—Wooster, Davis & Cifelli ABSTRACT: A cable clamp for an electrical connector device including a fixed and rigid clamping member and a flexible and resilient movable clamping member. The movable clamping member is made of a long term strain relieving material which will follow the cable as the cable creeps under the applied load.

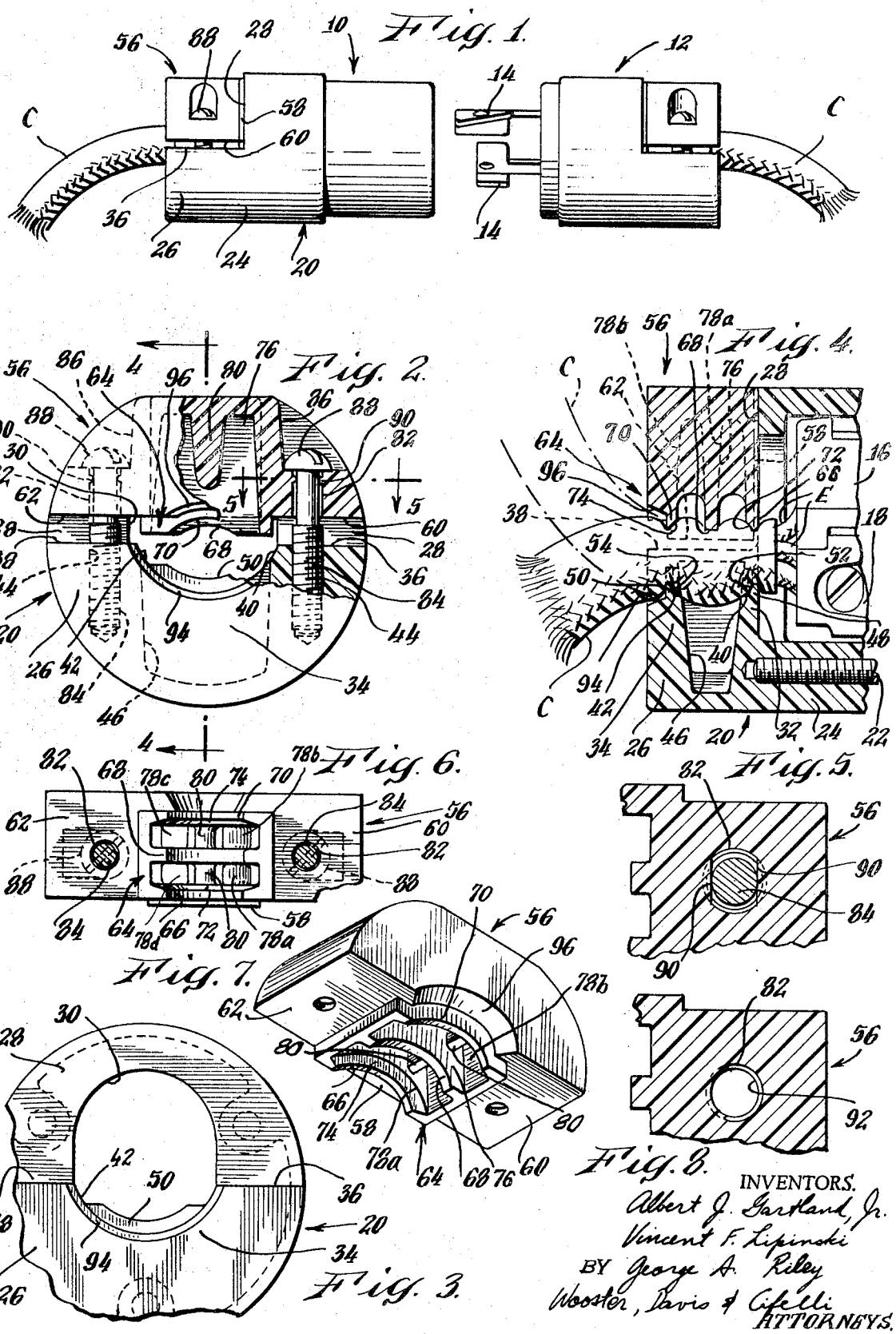

PLASTIC CABLE CLAMP

BACKGROUND OF THE INVENTION

This invention relates to an improved plastic cable clamp for wiring devices and more particularly to a cable gripping device which will maintain a constant gripping force upon an electrical power cable as the cable covering undergoes creep.

In electrical wiring devices which are intended for use with electrical power cables of various size, construction, and material composition it is essential that the cable be firmly gripped at all times to prevent strain on the internal wiring connections at the terminals of the device when external loads are applied to the cable.

For a given cable diameter and construction the ability of the cable clamp to apply a long term gripping force is affected primarily by "creep," i.e. cold flow, characteristics of the materials used in the cable outer jacket and the insulation on the conductors. These materials are generally either elastomers or polymers and display varying degrees of continued deformation under load referred to as "creep." Of course, the greatest degree of deformation and greatest clamping load on the cable exist during initial clamping as the portion of the cable confined between the clamping members is forced to undergo a drastic change in shape in order to conform to the space available between the clamps. At the same time the resulting stress in the clamp members is at a maximum and the cable jacket material undergoes its highest creep rate causing the clamping load and the stress in the clamp members to fall off rapidly after initial clamping. Creep then continues at a decreasing rate until the load imposed by the clamp members is insufficient to cause further creep.

If both clamp members are rigid, as in the case of the usual metal clamp members, long term strain relief is not provided since the clamp members do not follow the cable covering material as it creeps in the clamping area. On the other hand, if both clamping members are flexible and not resilient the initial clamping load may cause the clamp members to deform beyond their elastic limit thus imparting a lower clamping load to the cable. This arrangement will ultimately yield a lower final clamping load after creep has taken place than would be the case with rigid clamp members.

If both clamp members are flexible and resilient, there is a tendency for them to follow the cable as it creeps, thereby causing more long term deformation and intimate contact with the cable than would be the case with the rigid members, and a higher initial clamping load than would be the case with the flexible clamp members.

SUMMARY OF THE INVENTION

Accordingly, it is the primary object of this invention to provide a cable clamping arrangement including a pair of opposed clamp members at least one of which is made of a flexible and resilient plastic material having long term strain relieving characteristics.

Another object of this invention is to provide a cable clamping arrangement in which one of the clamp members is flexible and resilient and the other clamp member is fixed and rigid to assist in maintaining the proper aligning relationship between the clamping screws.

Still another object of this invention is to provide a cable clamping arrangement including clamping ribs formed upon the clamp members which will distort the cable covering into a sinuous path by creating points of high pressure.

To accomplish these objects, in one form, there is provided an electrical connector device including an insulator body, a plurality of electrical terminal-contact elements supported by the insulator body, each terminal-contact element adapted to receive electrically conductive wire lead ends of an electrical power cable, cable clamping means mounted on the insulator body including a pair of clamp members relatively radially movable with respect to one another, one of the members being made of a flexible and resilient long term strain relieving material, and clamping screws securing the pair of clamp members together.

BRIEF DESCRIPTION OF THE DRAWING

Other objects and further details of that which is believed to be novel and the invention herein will be clear from the following description and claims taken with the accompanying drawing wherein:

FIG. 1 is a side elevational view of a disconnected electrical connector wherein each of the connector devices includes a cable clamping arrangement constructed in accordance with this invention;

FIG. 2 is an end elevational view of either the connector body or connector cap showing the novel clamping arrangement which has been partially broken away to show the construction of the movable clamp member;

FIG. 3 is an end elevational view similar to that of FIG. 2 showing the cover with the movable clamp member removed.

FIG. 4 is a sectional view taken substantially along line 4—4 of FIG. 2;

FIG. 5 is a sectional view taken substantially along line 5—5 of FIG. 2 showing the clamping screw captivating means;

FIG. 6 is an elevational view of the movable clamp member taken in the direction of the clamping face;

FIG. 7 is a perspective view of the movable clamp member; and

FIG. 8 is a sectional view similar to the view of FIG. 5 showing a modified form of the clamping screw captivating means.

DESCRIPTION OF THE PREFERRED EMBODIMENT

Turning now to the drawing, there is illustrated in FIG. 1 an electrical connector comprising an electrical connector body 10 and electrical connector cap 12 having the usual blades 14, each connector device having a power cable C connected thereto. The clamping arrangements of both connector devices are identical and therefore only one will be described as being representative of the two.

Each connector device includes a plastic insulator body 16 provided with usual cavities for receiving the terminal-contact elements 18 (note FIG. 4). The bared conductor lead ends E of the power cable C are connected to the electrical terminal portions of the terminal-contact elements 18. A cover 20, made of a suitable plastic material, is secured to the insulator body 16 by means of elongated securing screws 22 and encloses the current carrying elements of the connector. The cover 20 may be considered to comprise two portions, a generally cylindrical protective housing portion 24 and a semicylindrical clamping portion 26. The protective housing portion 24 of the cover 20 is provided with a transverse wall 28 provided with an opening 30 through which the cable C may be passed to the interior of the connector device.

The semicylindrical clamping portion 26 of the cover 20 is molded integral with the cylindrical housing portion 24, its cylindrical wall being an extension of a portion of the cylindrical wall of the housing portion. The clamping portion includes: an interior transverse wall 32 whose lower surface is coplanar with the upper surface of the transverse wall 28 and which together with the transverse wall 28 completes the protective enclosure formed by the housing portion 24; an exterior transverse wall 34; and coplanar axially extending chordal wall portions 36 and 38 which are separated by arcuate cutouts 40 and 42 defined in the interior and exterior transverse walls 32 and 34. The arcuate cutouts when viewed axially as in FIG. 3 complete an ellipse with the opening 30. Tapped openings 44 are provided in the body of the semicylindrical clamping portion through the chordal wall portions 36 and 38. A deep cavity 46 is located between the chordal wall portions 36 and 38, and the interior and exterior transverse walls 32 and 34. Arcuate ribs 48 and 50 extend radially inwardly from the surfaces of the arcuate cutouts 40 and 42, respectively. These ribs are wedge-shaped in cross section, the beveled surfaces 52 and 54 facing one another.

A movable clamp member 56 is made of nylon or other similar flexible and resilient material having the desirable characteristics of strength, durability and long term strain relief. The movable clamp member 56 in the shape of an arcuate portion of a cylindrical disc is formed to cooperate with the clamping portion 26 and to be seated on the transverse wall 28. A bearing seat 58 contacts the transverse wall 28. Coplanar axially extending chordal wall portions 60 and 62 are separated by a radially inwardly extending clamping box 64. The clamping box includes three arcuate ribs 66, 68 and 70. The remote ribs 66 and 70 are wedge-shaped in cross section having beveled surfaces 72 and 74 facing one another and are positioned to oppose ribs 48 and 50 when the movable clamp member 56 is in clamping position. The central rib 68 is the exposed portion of a web 76 which bisects a deep cavity 78 defined in the movable clamp member. Flexure of the central rib 68 under the high clamping loads is prevented by an axially extending reinforcing rib 80 which together with the central rib 68 forms four smaller cavities 78a, 78b, 78c, and 78d in the deep cavity 78. The clamp member 56 includes a pair of openings 82 formed on either side of the clamping box 64 to pass a pair of clamping screws 84. The openings are positioned to be in alignment with the tapped openings 44 when the movable clamp member is in clamping position. Recessed seats 86 are provided in the arcuate surface of the clamp member to receive the screw heads 88. Each of the openings 82 includes a pair of chordal screw captivating webs 90 which extend radially inwardly to interfere slightly with the threads of the clamping screws 84 (note FIG. 5). The captivating webs 90 will prevent the screw from accidentally falling out but the screw can be pulled past the webs if so desired.

In FIG. 8 there is illustrated a modified form of the clamping screw captivating means which includes a thin annular web 92 of material which performs in a similar manner to the pair of chordal webs 90 shown in FIG. 5.

With regard to FIG. 4 it should be noted that each of the cable clamping members 26 and 56 includes a sloping beveled portion 94 and 96 at the end where the cable C enters in order to allow the cable to form a large bend radius (as shown in dot-dash lines) for a given side load to prevent sharp bends which may damage the internal electrical conductors.

Once the bared conductor lead ends E of the electrical power cable C have been connected to their respective terminals and the cover 20 is secured to the insulator body by securing screws 22, the movable clamp member 56 may be positioned upon the transverse wall 28 and secured to the fixed clamp member 26 by means of clamping screws 84. Tightening of the clamping screws causes the two clamp members 26 and 56 to be drawn together clamping the power cable C therebetween. Thus, the five arcuate ribs, viz two (48, 50) on the fixed clamp member and three (66, 68, 70) on the movable clamp member create points of high pressure which distort the cable jacket and the inner conductors, as shown in FIG. 4. It is this distortion of the cable jacket and inner conductors that prevents movement of the conductor lead ends within the electrical connector device when an axial load is applied to the cable, the greatest portion of the axial load being imposed on the clamp members. The central rib 68 urges the captured and distorted portion of the cable C into the cavity 46 so that the cable follows a sinuous path through the clamp members to further insure that axial cable loads will not be transmitted to the internal wiring terminals 18. The initial clamping load may be so great as to distort the flexible and resilient movable clamp member 56. As the cable C undergoes its highest creep rate the flexible and resilient movable clamp member follows the cable in intimate contact therewith while strain relieving itself, thereby causing further deformation of the cable.

Since the clamp members 26 and 56 are formed of an electrically nonconductive material the electrical shock hazard is greatly reduced. The use of polymeric materials in the clamp members actually provides additional insulation and eliminates the need for grounding exterior parts. Furthermore, the configuration of the clamping portions, viz the arcuate cutouts 40 and 42 and arcuate ribs 66, 68 and 70, is such that the cable will never contact the clamping screws 84 regardless of cable size or construction.

It should be understood that the present disclosure has been made only by way of example, and that numerous changes in details of construction and the combination and arrangement of parts may be resorted to without departing from the true spirit and scope of the invention. For example, both clamp members may, if desired, be flexible and resilient. However, this type of construction is not altogether satisfactory since it is difficult to maintain the clamping screws aligned as the clam members are drawn together and deflect under load.

We claim:

1. An electrical connector device comprising: a generally cylindrical housing having a hollow interior and an end wall bounding said interior at one end of said housing, said end wall being formed with an opening for receiving an electrical cable therethrough; and insulator body accommodated in said interior and secured to said end wall; contacts mounted on said body for electrical connection with the electrical conductors of the cable; a first generally semicylindrical clamping portion formed integral with said housing and extending outwardly from said end wall thereof, and a second substantially arcuately-shaped clamping portion movable toward and away from said first clamping portion, said second clamping portion being made of a flexible and resilient long term strain relieving plastomeric material and said first clamping portion being rigid, said first and said second clamping portions together defining a passage accommodating the cable passing therethrough and including cooperating cable gripping means in said passage engaging the cable, and fastener means securing said first and said second clamping portions together, whereby the electrical power cable jacket may be initially clamped and distorted by said clamping portions, said second clamping portion also being distorted by the clamping load, and as the cable jacket creeps under stress said second clamping portion will strain relieve itself and follow the cable jacket to remain in intimate contact therewith.

2. The electrical connector device defined in claim 12, wherein said cable gripping means comprises opposed radially inwardly extending arcuately shaped ribs which cooperate to partially encircle the cable, said ribs being located upon the facing surfaces of said clamping portions in said passage, said second clamping portion having a first rib, a second rib spaced therefrom, and a third rib positioned centrally between said first and second ribs; said first clamping portion having a first rib and a second rib positioned to respectively oppose said first and second ribs of said second clamping portion when said first and second clamping portions are in clamping position, and a cavity defined intermediate said first and second ribs of said first clamping portion and opposing said third rib of said second clamping portion, whereby the clamped portion of the cable will be urged in a sinuous path to resist pull out when said clamping portions are in clamping position.

3. The electrical connector device as defined in claim 2, wherein said first ribs of said first and second clamping portions are located adjacent the cable entering end of said passage, and beveled walls are positioned between said firs ribs and said cable entering end to prevent sharp bending of the cable, and wherein said fastener means comprises a pair of clamping screws extending through said second clamping portion, cooperating screw-receiving openings in said first clamping portion for receiving said clamping screws, and screw-retaining means on said second clamping portion for normally retaining said screws on said latter portion.

4. The electrical connector as defined in claim 3, wherein said second clamping portion comprises bores defined therethrough to permit passage of a threaded shank portion of said clamping screws, said bores being positioned in alignment with said screw-receiving openings in said first clamping portion when said second clamping portion is in clamping position, and wherein said screw-retaining means comprises substantially resilient screw captivating webs extending radially inwardly in said bores, said webs being operative to slightly yieldably engage said threaded shank portion of said screws in nonclamping position of said second clamping portion to prevent accidental removal of said screws from said bores and operative to permit desired removal of said screws from said bores.

5. The electrical connector as defined in claim 1, wherein said generally cylindrical housing comprises a protective housing portion covering said insulator body for protecting said contacts mounted on the former.